(12) United States Patent
Watanabe et al.

(10) Patent No.: US 6,503,600 B2
(45) Date of Patent: Jan. 7, 2003

(54) MAGNETIC RECORDING MEDIUM USING A GLASS SUBSTRATE

(76) Inventors: Tsuyoshi Watanabe, 97-2, Gochoda, Takane-cho, Kitakoma-gun, Yamanashi (JP); Koji Takahashi, 2063-5, Ryuou, Ryuou-cho, Nakakoma-gun, Yamanashi (JP); Masao Takano, 1511-10, Nagasakakamijou, Nagasaka-cho, Kitakoma-gun, Yamanashi (JP)

( * ) Notice: Subject to any disclaimer, the term of this patent is extended or adjusted under 35 U.S.C. 154(b) by 0 days.

(21) Appl. No.: 09/881,023

(22) Filed: Jun. 15, 2001

(65) Prior Publication Data

US 2001/0041271 A1 Nov. 15, 2001

Related U.S. Application Data

(62) Division of application No. 08/998,606, filed on Dec. 29, 1997, now Pat. No. 6,277,465.

(30) Foreign Application Priority Data

Dec. 27, 1996 (JP) ............................................. 8-351317

(51) Int. Cl.[7] .................................................. G11B 5/82
(52) U.S. Cl. ....................... 428/141; 428/410; 428/426; 428/694 TS; 428/694 SG; 428/694 ST; 428/900
(58) Field of Search ..................... 428/694 SG, 694 ST, 428/141, 694 TS, 426, 410, 900

(56) References Cited

U.S. PATENT DOCUMENTS 4,908,727 A    3/1990   Ezaki et al. ................. 360/135
5,476,821 A   12/1995   Beall et al. ................... 501/10
5,567,217 A   10/1996   Goto et al. ................... 65/33.1
5,800,931 A    9/1998   Lee et al. .................... 428/611
5,820,969 A   10/1998   Satoh .......................... 428/141

FOREIGN PATENT DOCUMENTS

| JP | 5-303735 | 11/1993 |
| JP | 5-325163 | 12/1993 |
| JP | 7-240025 | 9/1995 |
| JP | 8-293177 | 11/1996 |

OTHER PUBLICATIONS

Shaun E. McKinlay et al.; "Microstructure/Magnetic Property Relationship In CoCrPt Magnetic Thin Films"; 1996 IEEE; pp. 3587–3589.

Primary Examiner—Steven A. Resan
(74) Attorney, Agent, or Firm—Sughrue Mion, PLLC

(57) ABSTRACT

In a magnetic recording medium, surface roughness of a glass substrate and the variation of the surface roughness are suppressed to the predetermined range. Namely, the surface roughness (Rmax, Ra, Rq) and the relation (Rmax/Ra) between Rmax and Ra are restricted to the predetermined range. In this event, Ra is representative of a center-line mean roughness, Rmax is defined as a maximum height representative of a difference between a highest point and a lowest point and Rq is representative of a root mean square roughness. Thereby, crystal grains of an underlying layer and a magnetic layer formed thereon are equalized. Specifically, the surface roughness is specified by $Rmax \leq 15$ nm, $Ra \leq 1$ nm and $Rq \leq 1.5$ nm. Further, the ratio between the surface roughness Rmax and the surface roughness Ra is specified by $Rmax/Ra \leq 30$.

7 Claims, 5 Drawing Sheets

MAGNETIC RECORDING MEDIUM USING A GLASS SUBSTRATE

This is a divisional of application Ser. No. 08/998,606 filed Dec. 29, 1997 now U.S. Pat. No. 6,277,465, the disclosure of which is incorporated herein by reference.

BACKGROUND OF THE INVENTION

This invention relates to a magnetic recording medium for recording and reproducing at a high density, a glass substrate for the magnetic recording medium and a method of manufacturing the same.

Recently, a Magnetic disk having a high recording density has been demanded. To achieve the high recording density, it is important to reduce a flying height of a magnetic head for a surface of a magnetic recording medium. In recent years, it has been required that the flying height falls within the range between 0.1 and 0.2 $\mu$m. To satisfy such a requirement, the magnetic disk having the high recording density has been developed as disclosed in Japanese Unexamined Patent Publications Nos. H5-303735 and H8-293177.

In the magnetic disk disclosed in the above-mentioned Japanese Unexamined Patent Publication No. H5-303735, an annular-shape substrate (glass substrate) has a surface roughness Ra of 1 $\mu$m or less and a flatness of 1 $\mu$m or less. Thereby, the flying height of the magnetic head for the magnetic disk is reduced to realize the high recording density. In the above-mentioned conventional technique, additional disclosure is made about a polishing method for smoothing the surface roughness of the annular-shaped substrate (glass substrate), and the glass substrate with its surface finished in a super-smoothing manner so that the surface roughness is set to 0.3 nm or less by Ra and 5 nm or less by Rmax.

Further, disclosure is made about a magnetic disk which is equipped in a dynamic head loading type magnetic disk drive in the Japanese Unexamined Patent Publication No. H8-293177. In the above-mentioned dynamic head loading type magnetic disk drive, the head is separated from the disk during a stop operation instead of the CCS drive in which the head halts on the medium during start/stop operations of the magnetic disk. This magnetic disk is structured by forming a magnetic layer having a super smooth finished magnetic surface and a protection layer having a super smooth finished protection surface on a super smooth finished substrate. Thereby, a magnetic distance between the head and the medium is reduced to realize the high recording density. Further, additional disclosure is made about a method for reducing a distance (effective flying height) between the surface of the magnetic layer and the magnetic head by reducing the film thickness of the protection layer.

In the above-mentioned conventional magnetic recording medium, the magnetic distance between the head and the medium can be sufficiently reduced by setting Rmax and Ra to predetermined values or less. However, according to inventor's research, it has been found out that the magnetic characteristic, such as the coercive force and the S/N ratio, and the record/reproduce characteristic do not sufficiently satisfy the recent strict demand in the conventional magnetic recording medium. Namely, even when the magnetic recording media are manufactured in the condition that the surface roughness of the glass substrate and the manufacturing condition of the magnetic layer formed thereon are made uniform, the magnetic disk having an excellent magnetic characteristic can not be always obtained. The inventors have enthusiastically researched about this cause. As a result, it has been concluded that the cause results in the variation of the surface roughness of the glass substrate, and the crystal growth of a thin film formed thereon, such as the magnetic layer, is disturbed due to the variation to deteriorate the magnetic characteristic and the record/reproduce characteristic. That is, the surface state (the surface roughness and the variation of the surface roughness) of the glass substrate relates to the crystal grain of the underlying layer and the magnetic layer which are formed thereon. Therefore, it is necessary to suppress the surface roughness of the glass substrate and equalize the crystal grains of the thin film formed thereon to obtain the magnetic recording medium which has an excellent magnetic characteristic and which is capable of recording and reproducing at the high density.

On the other hand, the relation between Rmax and Ra has not been considered at all in the above-mentioned conventional magnetic recording medium. Therefore, even if the substrate is excessively smoothed, the magnetic characteristic of each magnetic recording medium is fluctuated when a plurality of magnetic recording media are manufactured. Namely, even when the magnetic media are manufactured in the condition that the surface roughness of the glass substrate and the magnetic layer formed thereon are kept in the same manufacturing condition, the magnetic disk having stable and excellent magnetic characteristic can not be always obtained. In particular, the variation of the magnetic characteristic remarkably occurs when the magnetic disk is manufactured by the use of the known in-line type sputtering method.

Therefore, inventors has enthusiastically researched the causes. As a result, it has been found out that the relation (Rmax/Ra) between the surface roughness Rmax and Ra is not specified in the conventional techniques. Consequently, it has been concluded that the fluctuation of the magnetic characteristic of each magnetic disk may occur with the variation of the above-mentioned relation (Rmax/Ra).

SUMMARY OF THE INVENTION

This invention is performed based upon the above-mentioned analyzed result. It is an object of this invention to provide a magnetic recording medium which has a stable and excellent magnetic characteristic and which is capable of recording and reproducing at a high density.

According to this invention, the surface roughness of the glass substrate and the variation of the surface roughness are suppressed to the predetermined range. Namely, the surface roughness (Rmax, Ra, Rq) and the relation (Rmax/Ra) between Rmax and Ra are restricted to the predetermined range. In this event, Ra is representative of a center-line mean roughness, Rmax is defined as a maximum height representative of a difference between a highest point and a lowest point and Rq is representative of a root mean square roughness. Thereby, crystal grains of the underlying layer and the magnetic layer formed thereon are equalized. Consequently, the magnetic recording medium having an excellent magnetic characteristic and a high record/reproduce characteristic can be obtained. Specifically, the surface roughness is specified by Rmax$\leq$15 nm, Ra$\leq$1 nm and Rq$\leq$1.5 nm. Further, the ratio between the surface roughness Rmax and the surface roughness Ra is specified by Rmax/Ra$\leq$30.

DESCRIPTION OF THE PREFERRED EMBODIMENTS

Figure 1:
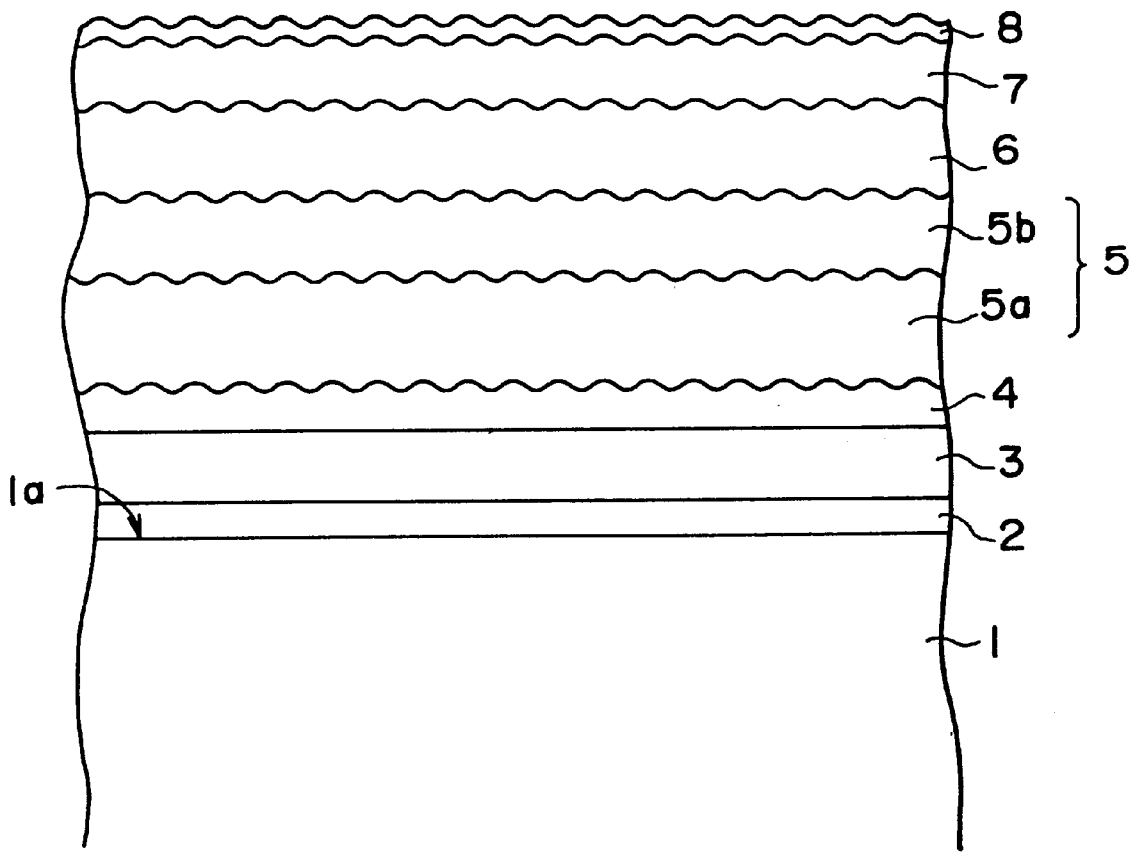
FIG. 1 is a partial cross sectional view showing a magnetic recording medium according to an example 1 of this invention.

Referring to FIG. 1, description will be made about a magnetic recording medium of this invention and a method of manufacturing the same.

In a magnetic recording medium illustrated in FIG. 1, a first underlying layer 2, a second underlying layer 3, an irregularity forming layer 4 (a texture layer), a third underlying layer 5 consisting of a Cr layer 5a and a CrMo layer 5b, a magnetic layer 6, a protection layer 7 and a lubricant layer 8 are successively formed on a glass substrate 1. Thus, a magnetic disk is obtained.

Hereinafter, detailed description will be made about a method of manufacturing the above-mentioned magnetic disk with each manufacturing step and structure.

(1) Roughing Step

First, a glass substrate of an aluminosilicate glass was cut into a disc-shape having a diameter of 96 mm and a thickness of 3 mm by a grinding stone from a sheet glass formed by the down draw method. The glass substrate was ground by a relatively rough diamond grindstone to obtain the glass substrate having the diameter of 96 mm and the thickness of 1.5 mm. In this event, the glass substrate may be cut into the disc-shape in the same manner as the above from the sheet glass formed by the float method instead of the above-mentioned down draw method. Alternatively, the disc-shaped glass substrate may be formed by directly pressing a melting glass with a cope, a drag and a drum instead of the down draw method.

A chemical reinforced glass was used as the above-mentioned aluminosilicate glass. The chemical reinforced glass contains 57–74% of $SiO_2$, 0–2.8% of $ZnO_2$, 3–15% of $Al_2O_3$, 7–16% of $LiO_2$ and 4–14% of $Na_2O$ as a main component. For example, the chemical reinforced glass contains 67.0% of $SiO_2$, 1.0% of $ZnO_2$, 9.0% of $Al_2O_3$, 12.0% of $LiO_2$ and 10.0% of $Na_2O$ as a main component.

Subsequently, the both principal surfaces of the glass substrate were ground by a diamond grindstone having grains smaller than those of the above-mentioned grindstone. In this case, a load was set to the extent of 100 Kg. Thereby, the both principal surfaces of the glass substrate were ground into a surface roughness Rmax of about 10 μm.

Next, an opening was formed at a center portion of the glass substrate by using a cylindrical grindstone. Further, the outer side end surface was ground to a diameter of 95 mm. Thereafter, the outer and the inner end surfaces were chamfered. In this case, the end surface (the side surface and the chamfered portion) of the glass substrate had a surface roughness Rmax of about 4 μm.

(2) Mirror Finishing Step of the End Surface

Subsequently, the glass substrate was polished by the use of a brush polishing by rotating the glass substrate so that the surface roughness of the end surface portion (the angular portion, the side surface and the chamfered portion) of the glass substrate is set to about 1 μm by Rmax and to about 0.3 μm by Ra. The mirror finishing step is effective for preventing a film defect which is caused by dusts which are attached to the principal surface of the glass substrate. In this event, the dusts are generated from the end surface of the glass substrate when the glass substrate is transferred or when the glass substrate is cleaned.

The glass substrate was washed with water after the above-mentioned mirror finishing step. In this case, the mirror finishing step may be carried out before each of first, second and third polishing steps which will be described later, and may not be carried out.

(3) Lapping Step

The lapping step was performed for the glass substrate to improve dimension and shape accuracy. The lapping step was carried out by using a lapping apparatus. In this case, the lapping step was conducted two times by changing grain degree from #400 to #1000. Specifically, the lapping was performed for the both principal surfaces of the glass substrates which were contained in a carrier so that the principal surfaces had a surface accuracy of 0–1 μm and the surface roughness Rmax of about 6 μm. In this event, the lapping was carried out by rotating an inner gear and an outer gear by the use of alumina grains having a grain degree of #400 in the condition that the load L was kept at about 100 Kg. Next, the lapping was performed by changing the grain degree of the alumina grain into #1000. In this case, the surface roughness Rmax was set to about 2 μm. Subsequently, the glass substrate was successively immersed in washing units of natural detergent and water to be washed after the lapping step was completed.

(4) First Polishing Step

Next, a first polishing step was performed by the use of a polishing apparatus to remove a defect and a distortion remaining in the above-mentioned lapping process. Specifically, a hard polisher (which may be a cerium impregnated foamed urethane pad, such as MHC15 made by Speedfam) was used as polisher (polishing powder). In this case, the first polishing was performed under the following polishing condition.

Polishing liquid: oxide cerium (grain size of 1 μm)+water
Load: 150–300 g/cm² (L=238 kg)
Polishing time: 15–30 minutes
Removing amount: 25–45 μm
Revolution of lower surface plate: 40 rpm
Revolution of upper surface plate: 35 rpm
Revolution of inner gear: 14 rpm
Revolution of outer gear: 29 rpm The glass substrate was washed by being successively dipped in washing units of natural detergent, pure water, pure water, IPA (isopropyl alcohol), IPA (vapor drying) after the first polishing step. In this event, the washing step may be omitted if a polishing liquid in the subsequent second polishing step is the same as the above.

(5) Second Polishing Step

Next, a second polishing was conducted by changing the above-mentioned hard polisher into a soft polisher (which may be a polishing pad of a suede type, such as Polylax made by Speedfam) by using the polishing apparatus used in the first polishing step. The polishing condition is similar to the first polishing step except for the load of 25–150 g/cm², the polishing time of 5–20 minutes and the removing amount of 2.5–10 μm. The glass substrate was successively immersed in washing units of the natural detergent, the natural detergent, the pure water, the pure water, the IPA (isopropyl alcohol), the IPA (vapor drying) to be washed therein after the second polishing step. In this case, a supersonic wave was applied to each the washing units.

(6) Third Polishing Step

Next, a third polishing was conducted by changing into a super soft polisher (polishing powder: 0.5 μm or less) by using the polishing apparatus used in the second polishing step. The polishing condition is similar to the second polishing step except for the polishing liquid of colloidal silica (grain size: 0.2 μm or less)+water, the load of 25–100 g/cm$^2$, the polishing time of 5–20 minutes and the removing amount of 1–5 μm. The glass substrate was successively immersed in washing units of the natural detergent, the natural detergent, the pure water, the pure water, the IPA (isopropyl alcohol), the IPA (vapor drying) to be washed therein after the above-mentioned super precise polishing step. In this case, a supersonic wave was applied to each of the washing units. In this event, it is desirable that an abrasive used in the third polishing step is small in grain size. The grain size is preferably equal to 0.15 μm or less, and more preferably 0.1 μm or less.

Further, the above-mentioned hard polisher and the soft polisher are not restricted to the above-mentioned materials. Hard velour, foamed urethane, pitch impregnated suede, or the like are exemplified as the hard polisher while a suede, a velour or the like are exemplified as the soft polisher. Further, cerium oxide, alumina, red oxide, chromium oxide, zirconium oxide, titanium oxide and colloidal silica or the like are exemplified as the abrasive.

In this event, the grain size of the abrasive of the polishing liquid used in the first to third polishing steps is not restricted to the above-mentioned grain size. The grain size falls within the range between 1 and 3 μm in the first polishing step while the grain size falls within the range between 0.5 and 2 μm in the second polishing step. Further, the grain size is adjusted within the range of 0.5 μm or less in the third polishing step. In this event, a flattening process is efficiently performed by using the abrasive having the above-mentioned range to obtain the smooth substrate having no variation in the roughness.

(7) Chemical Reinforcing Step

Next, a chemical reinforcing step was performed for the glass substrate after the grinding and polishing step was completed. First, a chemical reinforcing solution was prepared by mixing potassium nitrate (60%) with sodium nitrate (40%). The chemical reinforcing solution was heated up to 400° C. The glass substrate which was washed and preheated to 300° C. was dipped in the chemical reinforcing solution for 3 hours. The chemical reinforcing step was carried out so that the entire surface of the glass substrate was chemically reinforced with a plurality of glass substrates retained at the end surface in a holder. Under the circumstances, lithium ions and sodium ions on a surface layer of the glass substrate were replaced by sodium ions and potassium ions in the chemical reinforcing solution by dipping each glass substrate in the chemical reinforcing solution. Thus, the glass substrate is chemically reinforced. A compressive stress layer formed in the surface layer of the glass substrate had a thickness of about 100 to 200 μm. Next, the chemically reinforced glass substrate was dipped in a water tank of 20° C. quickly cooled and retained for 10 minutes. Subsequently, the cooled glass substrate was dipped in a sulfuric acid heated up to 40° C., and was washed in the condition that the supersonic wave is applied. Thus, the glass substrate in which the principal surface was super precisely polished was obtained.

Under the above-mentioned condition, the polishing process was carried out with several steps, and the grain size of the abrasive used in each step was selected to a size smaller than the normal case. Thereby, the glass substrate having the super smooth surface can be obtained and further, a manufacturing efficiency can be excessively improved.

In this event, the surface roughness of the principal surface of the glass substrate was measured. As a result, Rmax was 2.6 nm, Ra was 0.23 nm and the ratio (Rmax/Ra) of the surface roughness was 11.3. In this case, Ra is representative of the center-line mean roughness (defined in Japanese Industrial Standard JIS B0601) while Rmax is defined as a maximum height representative of a difference between a highest point and a lowest point (defined in Japanese Industrial Standard JIS B0601). The surface roughness was measured by the use of the interatomic force microscope (AFM).

In the above-mentioned embodiment, the third polishing step was performed before the chemical reinforcing step. However, the third polishing step may be carried out after the chemical reinforcing step to prevent the film defect. In this event, the film defect is caused by the generation of deposited salt of the glass substrate due to the chemical reinforcement.

(8) Magnetic Disk Manufacturing Step

Subsequently, a heat treatment, deposition of the first underlying layer, deposition of the second underlying layer, deposition of the irregularity layer, deposition of the third underlying layer, deposition of the magnetic layer and deposition of the protection layer were successively carried out for the above-mentioned glass substrate by the use of the in-line sputtering apparatus.

The in-line type sputtering apparatus (not shown) has a first chamber in which a substrate heater is arranged, a second chamber in which an Al target, a Cr target and an Al target are arranged, a third chamber in which a heater is arranged, a fourth chamber in which a Cr target, CrMo target (Cr: 94 at %, Mo: 6 at %) and CoCrPtTa target (Co: 78 at %, Cr: 13 at %, Pt: 6 at %, Ta: 3 at %) are successively arranged and a fifth chamber in which a carbon target is arranged, along the moving direction.

Fifty sheets of the glass substrates were attached on a pallet consisting of titanium and the like to be introduced into the first chamber via a load lock chamber. These glass substrates were successively transferred into the respective chambers by a carrier apparatus at a constant rate to deposit and process in the following conditions.

Namely, the substrate was heated to 350° C. for 2 minutes in the first chamber. An Al film (the first underlying layer 2) having an average film thickness of 5 nm, a Cr film (the second underlying layer 3) having the film thickness of 20 nm, the irregularity forming layer 4 having the average film thickness of 5 nm and the successive texture film of Al having the surface roughness (Rmax) of 24 nm were deposited in the second chamber. The substrate was heated to 350° C. for 1 minute in the third chamber. The Cr film 5a (the third underlying layer 5) having the average film thickness of 50 nm, the CrMo film 5b having the average film thickness of 30 nm, the CoCrPtTa film (the magnetic layer 6) having the average film thickness of 24 nm were successively deposited in the fourth chamber. The carbon film (the protection layer 7) having the average film thickness 15 nm was deposited in the fifth chamber.

In this case, the sputtering conditions in the second, fourth and fifth chambers were as follows. Namely, the sputtering pressure was 5 mTorr in the second chamber while the sputtering pressure was 3 mTorr in the fourth chamber. Further, the sputtering pressure was 5 mTorr in the fifth chamber. Moreover, an inactive gas of argon was used as the sputtering atmosphere in the second and forth chambers. The inactive gas of argon, a mixing gas comprising a mixture of hydrogen and/or nitrogen of 1 to 25% with the argon, or a mixing gas comprising a mixture of hydrocarbon gas of 1 to 25% and the argon was used as the sputtering atmosphere in the fifth chamber. In addition, the sputtering power was 200 W in the third and fifth chambers while the sputtering power was 100 W in the sixth chamber.

Subsequently, the substrate having the protection layer was taken out from the in-line sputtering apparatus. Perfluoropolyether is applied to the surface of the protection layer by the dipping process. Thereafter, the lubricant layer having the average film thickness of 1 nm was formed to obtain the magnetic recording medium of an example 1.

Further, the magnetic characteristic and the record/reproduce characteristic of 0°, 90°, 180°, 270° (a center of a sputtering mark formed by the attachment of the pallet was specified as 0°) were measured at a portion of radius 22 mm of the obtained magnetic recording medium. As a result, the coercive force of each magnetic recording medium at each point fell within the range between 1900 and 2000 Oe while the S/N ratio fell within the range between 24.2 and 25.8 dB. The process capability index Cp which indicates the stability of the manufacturing process was evaluated. In this event, the Cp is represented by the following formula:

$$Cp = \frac{(\text{upper standard}) - (\text{lower standard})}{6 \times (\text{standard deviation})}$$

for both sides standard and, $$Cp = \frac{(\text{average value}) - (\text{lower standard})}{3 \times (\text{standard deviation})}$$

for lower limit standard.

As a result of the evaluation, the coercive force (Hc) becomes 2.4 for the both sides standard of 1900±100 Oe while the S/N ratio (dB) becomes 5.3 for the lower limit standard of 19 dB or more. Further, inplane distribution of each magnetic recording medium and the variation of the magnetic characteristic of the magnetic recording medium in the pallet could be suppressed. Consequently, the magnetic recording medium having an excellent magnetic characteristic could be obtained, and further, the stability of the manufacturing process could be improved.

In addition, the CSS durability test was carried out a hundred thousand times by using a head slider of 70% having the load of 3 g. As s result, no adsorption phenomenon occurred between the magnetic recording medium and the magnetic head, and no head crash is brought about. Thus, the magnetic recording medium having the high CSS durability was obtained. In this case, the coercive force (Hc) was measured by the use of the vibration sample type magnetometer at a maximum external applying magnetic field of 10 KOe by cutting a sample of 8 mmø from the magnetic recording medium and applying the magnetic field in the film surface direction.

Moreover, the record/reproduce characteristic (S/N ratio) was measured as follows. Namely, the obtained magnetic disk and the MR (magneto-resistive type) head having the flying height of 0.055 μm were used. In this event, the record/reproduce characteristic in a line recording density of 120 kfcl (line recording density of 120,000 bits per 1 inch) was measured in the condition that a relative rate between the MR head and the magnetic disk was set to 9.6 m/s. Further, medium noise during recording/reproducing signals was measured by the use of the known spectrum analyzer to calculate the S/N ratio in the condition that a carrier frequency was set to 23 MHz and a measuring bandwidth was set to 26 MHz. The MR head which was used in the above-mentioned measurement has a track width of 3.1/2.4 μm and a magnetic head gap length of 0.35/0.28 μm at write/read sides. In this case, the surface roughness, the crystal grain size, the coercive force and the S/N ratio of examples and comparative examples which will be described later were measured in the same manner as the above-mentioned method.

Examples 2 to 4, Comparative Examples 1 to 4

The magnetic recording medium was manufactured in the manner as the above-mentioned example 1 except that the polishing condition and the surface roughness of the glass substrate were changed. Thus, examples 2 to 4 and comparative examples 1 to 4 were made. The surface roughness Ra (nm), Rmax (nm) of the principal surface of the glass substrate, Rmax/Ra, the coercive force Hc (Oe), the S/N ratio (dB), Cp and the result of the CSS durability test are represented for the examples 2 to 4 and comparative examples 1 to 4 in Table 1.

TABLE 1

|  |  | Rmax (nm) | Ra (nm) | Rmax/Ra | HC (Oe) | Cp (both sides) | S/N (dB) | Cp (Lower limit) | CSS Durability |
|---|---|---|---|---|---|---|---|---|---|
| Example | 1 | 2.6 | 0.23 | 11.3 | 1900–2000 | 2.4 | 24.2–25.8 | 5.3 | ○ |
|  | 2 | 15.0 | 1.3 | 11.5 | 1850–2050 | 1.6 | 21.5–24.1 | 3.7 | ○ |
|  | 3 | 10.0 | 0.8 | 10.5 | 1865–2035 | 1.8 | 22.2–24.6 | 4.5 | ○ |
|  | 4 | 5.0 | 0.5 | 11.0 | 1875–2025 | 2.2 | 22.9–25.1 | 5.1 | ○ |
| Comparative Example | 1 | 18.5 | 1.2 | 15.4 | 1810–2090 | 1.2 | 20.4–23.6 | 3.0 | ○ |
|  | 2 | 14.3 | 1.4 | 10.2 | 1830–2070 | 1.3 | 21.3–23.9 | 3.5 | ○ |
|  | 3 | 9.0 | 1.0 | 9.0 | 1840–2060 | 1.5 | 21.9–24.5 | 4.0 | X |
|  | 4 | 18.4 | 1.7 | 10.8 | 1800–2100 | 1.1 | 19.5–23.5 | 2.9 | Δ |

From the above-mentioned result, the coercive force falls within the range between 1850 and 2050 Oe while the S/N ratio is 19 dB or more in the examples. Further, both Cp (both sides) and Cp (lower limit) exceed 1.3 so that the variation of the magnetic characteristic is suppressed. Thus, the magnetic recording medium can be stably manufactured in the examples.

On the other hand, Rmax/Ra is less than 10 in the comparative examples. Consequently, the adsorption between the magnetic head and the magnetic recording medium occurs to deteriorate the CSS durability. Further, Rmax and/or Ra are large in the comparative examples. Consequently, the variation of the magnetic characteristic such as the coercive force (Oe) and the S/N ratio (dB) becomes large. As a result, the stable magnetic recording can not be manufactured.

Examples 5 to 11, Comparative Examples 5 to 9

The magnetic recording medium was manufactured in the same manner as the above-mentioned example 1 except that the polishing condition and the surface roughness of the glass substrate were changed, the average film thickness of the first underlying layer 2 was set to 1 nm and the surface roughness (Rmax) of the irregularity forming layer was set to 24 nm. Thus, examples 5 to 11 and comparative examples 5 to 9 were made. The surface roughness Ra (nm), Rmax (nm), Rq (nm) of the principal surface of the glass substrate, Rmax/Ra, the average crystal grain size (nm) of the magnetic layer, the S/N ratio (dB) and the presence or absence of the head crash are represented for the examples 5 to 11 and comparative examples 5 to 9 in Table 2.

TABLE 2

|  |  | Surface Roughness of Substrate | | | Crystal Grain Size of Magnetic Layer (nm) | S/N (dB) | Head Crash |
| --- | --- | --- | --- | --- | --- | --- | --- |
|  |  | Ra (nm) | Rmax (nm) | Rq (nm) | Rmax/Ra |  |  |  |
| Exam- | 5 | 0.25 | 2.55 | 0.31 | 10.2 | 11 | 24.7 | ○ |
| ple | 6 | 0.33 | 7.77 | 0.39 | 23.5 | 13 | 24.4 | ○ |
|  | 7 | 0.42 | 9.80 | 0.50 | 23.3 | 15 | 24.0 | ○ |
|  | 8 | 0.46 | 12.0 | 0.58 | 26.1 | 18 | 22.8 | ○ |
|  | 9 | 0.68 | 3.54 | 0.79 | 5.2 | 21 | 22.4 | ○ |
|  | 10 | 0.84 | 7.84 | 1.05 | 9.3 | 25 | 22.1 | ○ |
|  | 11 | 0.93 | 9.86 | 1.12 | 10.6 | 30 | 22.0 | ○ |
| Com- | 5 | 1.15 | 10.3 | 1.60 | 8.96 | 40 | 20.3 | ○ |
| para- | 6 | 0.84 | 15.1 | 1.21 | 18.0 | 25 | 20.9 | X |
| tive | 7 | 0.79 | 3.55 | 1.52 | 4.50 | 34 | 20.5 | ○ |
| Exam- | 8 | 0.52 | 16.7 | 0.63 | 32.1 | 20 | 20.8 | X |
| ple | 9 | 1.50 | 14.9 | 3.50 | 9.93 | 45 | 19.5 | X |

Figure 6:
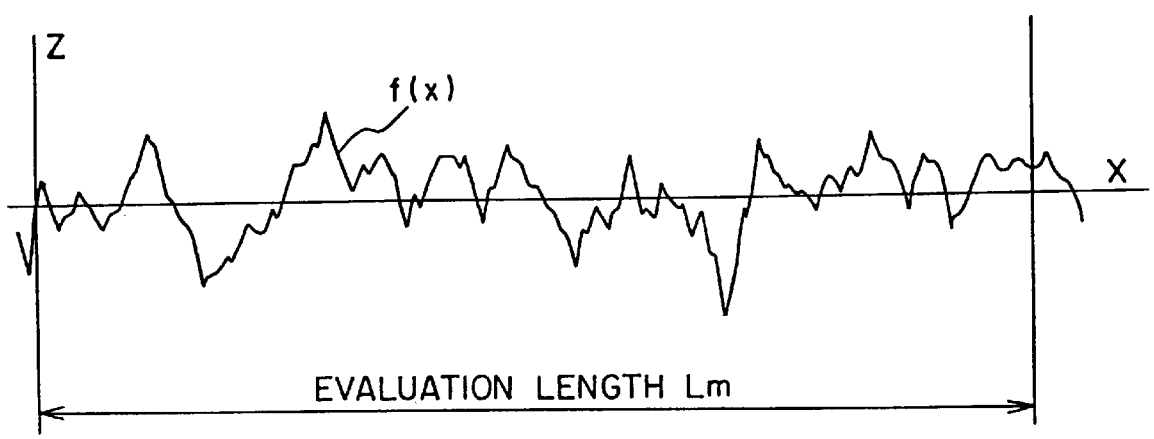
FIG. 6 shows a roughness curve which is used to define the root mean square roughness (Rq).

In this event, the root mean square roughness (Rq) is defined as follows. Namely, an evaluation length (Lm) is sampled in a center-line direction from a roughness curve 11 illustrated in FIG. 6. The root mean square roughness (Rq) is represented by the following equation:

$$Rq = \sqrt{\frac{1}{Lm}\int_0^{Lm} f(x)^2 dx},$$

where the roughness curve is represented by f(x). In this case, the center-line of the sampled portion is defined as the X axis while the direction of vertical magnification is defined as the Z axis.

That is, the root mean square roughness (Rq) is defined as the root of the value which is obtained by integrating the square of the deviation between the center-line and the roughness curve by the section of the evaluation length and averaging with the section.

The average crystal grain size of the magnetic layer of the magnetic recording medium of the example 5 was measured by the surface observation by the use of the known transmission electron microscope (TEM). As a result, the grain size of the magnetic layer was 11 nm by reflecting the crystal grain size of the underlying layer. Further, the distribution of the crystal grain size of the magnetic crystal grains was investigated. As a result, the half bandwidth from the grain size point which is mostly distributed was 20 nm or less. Thus, the magnetic layer having uniform crystal grain size was obtained. In this case, the distribution of the crystal grain size of the magnetic crystal grains was measured by the same measuring method as the magnetic crystal grain size distribution due to the TEM which is disclosed in a paper (IEEE Transaction on Magnetics. VOL. 32, NO. 5 [Microstructure/Magnetic Property Relationships in CoCrPt Magnetic Thin Films/Mary Doerner]. In this event, Number of Grains are plotted. The distribution of the crystal grain size was evaluated by the half band width from the maximum value of the Number of Grains.

Further, the magnetic characteristic and the record/reproduce characteristic of the obtained magnetic recording medium were measured. As a result, an excellent magnetic recording medium having the coercive force of 2300 Oe and the S/N ratio of 24.7 dB was obtained.

Moreover, the CSS durability test was carried out a hundred thousand times by using the head slider of 70% having the load of 3 g. As a result, no adsorption phenomenon occurred between the magnetic recording medium and the magnetic head, and further, no head crash is brought about. Thus, the magnetic recording medium having the high CSS durability was obtained. In this case, the coercive force (Hc) was measured by the use of the vibration sample type magnetometer at a maximum external applying magnetic field of 10 KOe by cutting a sample of 8 mmø from the magnetic recording medium and applying the magnetic field in the film surface direction.

Moreover, the record/reproduce characteristic (S/N ratio) was measured as follows. Namely, the obtained magnetic disk and the MR head having the flying height of 0.055 μm were used. In this event, the record/reproduce characteristic in the line recording density of 120 kfcl (line recording density of 120,000 bits per 1 inch) was measured in the condition that a relative rate between the MR head and the magnetic disk was set to 9.6 m/s. Further, the medium noise during recording/reproducing signals was measured by the use of the spectrum analyzer to calculate the S/N ratio in the condition that the carrier frequency was set to 23 MHz and the measuring bandwidth was set to 26 MHz. The MR head which was used in the above-mentioned measurement has the track width of 3.1/2.4 μm and the magnetic head gap length of 0.35/0.28 μm at write/read sides. In this case, the surface roughness, the crystal grain size, the coercive force and the S/N ratio in examples and comparative examples which will be described later were measured in the same manner as the above-mentioned method. Further, the coercive forces of the magnetic recording media of the examples 6 to 11 and the comparative examples 5 to 9 were measured. As a result, the magnetic recording medium had a high coercive force of 2000 (Oe) or more.

In the comparative examples 5 and 7, the surface roughness of the glass substrate became larger than 1.0 nm and/or Rq became larger than 1.5 nm. Consequently, the crystal grain size of the underlying layer formed thereon became large by irregular and abnormal growth. Thereby, it seems that the grain size of the magnetic layer became large, the variation is brought about and the S/N ratio was lowered.

In the comparative example 6, the surface roughness of the glass substrate became larger than 15.0 nm. This affected the surface of the magnetic disk. Consequently, the magnetic head could not run at a low flying height and the record/reproduce characteristic was deteriorated. Further, the S/N ratio was deteriorated by the abnormal crystal grain growth and the head crash occurred.

In the comparative example 8, the magnetic head could not run at the low flying height because the surface roughness Rmax of the glass substrate was large. Further, the difference between Ra and Rmax was large. Consequently, the crystal grain of the magnetic layer formed thereon locally and abnormally grew. As a result, the S/N ratio was deteriorated and the head crash due to abnormal projection was brought about.

In the comparative example 9, the crystal grain size of the magnetic layer became large and the variation of the crystal grain size occurred like the above-mentioned comparative examples 5 to 8. Consequently, the S/N ratio was deteriorated, the magnetic head could not run at the low flying height and the head crash was brought about.

Moreover, the distribution of the crystal grain size of the crystal grains of the magnetic layer was measured for the examples 6 to 10 like the example 5. Consequently, the same result as the example 5 was obtained. Namely, the magnetic layer having uniform crystal grain sizes was formed. On the other hand, the distribution of the grain sizes of the crystal grains of the magnetic layer was measured for the comparative examples 5 to 9. As a result, the crystal grain sizes were varied.

From the above-mentioned result, it is necessary that the surface roughness of the glass substrate is specified by Rmax≦15 nm, Ra≦1 nm, Rq≦1.5 nm, preferably, Rmax≦10 nm, Ra≦0.5 nm, Rq≦0.7 nm, more preferably, Rmax≦5 nm, Ra≦0.3 nm, Rq≦0.4 nm to obtain the magnetic recording medium which has excellent magnetic characteristic and record/reproduce characteristic and which has a high reliability without the head crash.

Similarly, the surface roughness of the glass substrate must be specified by Rmax≦15 nm, Ra≦1 nm, Rmax/Ra≦30 to obtain magnetic recording medium having an excessively high reliability. In this event, the average crystal grain size of the magnetic layer must fall within the range between 5 and 30 nm. Further, the surface roughness of the glass substrate is preferably specified by Rmax≦10 nm, Ra≦0.5 nm, and more preferably Rmax≦5 nm, Ra≦0.3 nm.

Examples 12 to 15 and Comparative Examples 9 to 13

The magnetic recording media were manufactured by changing the film thickness of the irregularity forming layer to investigate effects of the surface roughness of the glass substrate for the irregularity forming layer 4. Thus, the examples 12 to 15 and the comparative examples 9 to 13 were made. Namely, the magnetic recording media were manufactured by using the above-mentioned glass substrate of the example 5 in a similar manner as the example 5 except for changing the average film thickness of the irregularity forming layer into 5 nm (example 5), 6.5 nm (example 12), 6 nm (example 13), 4.5 nm (example 14) and 4 nm (example 15).

The glass substrate of the comparative example 5 was used as an example which departs from the range of this invention. Further, the magnetic recording media were manufactured in a similar manner as the above-mentioned example 1 except for changing the average film thickness of the irregularity forming layer 4 into 5 nm (comparative example 9), 6.5 nm (comparative example 10), 6 nm (comparative example 11), 4.5 nm (comparative example 12) and 4 nm (comparative example 13).

Figure 2:
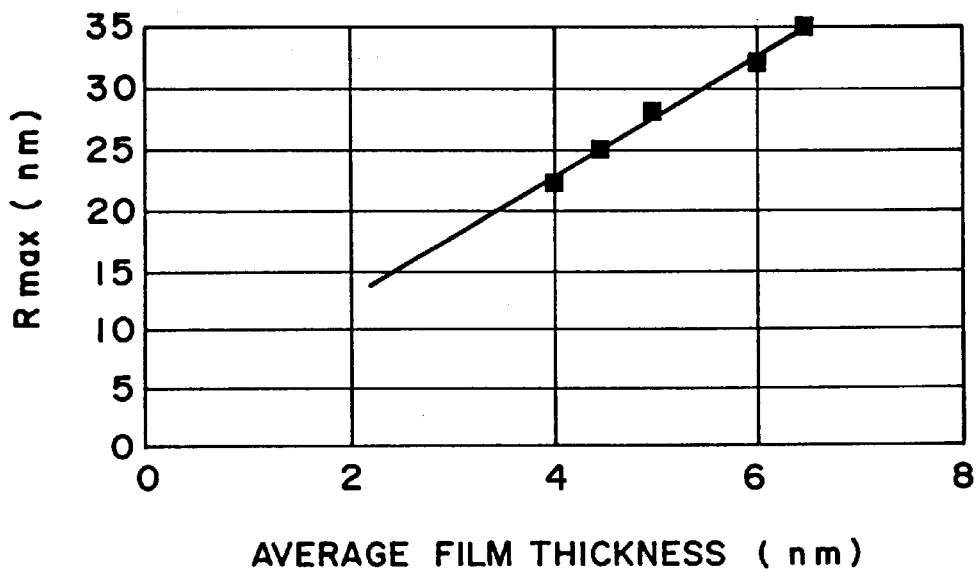
FIG. 2 is a graph showing a relation between an average film thickness of an irregularity forming layer and Rmax according to examples 12 to 15.
Figure 3:
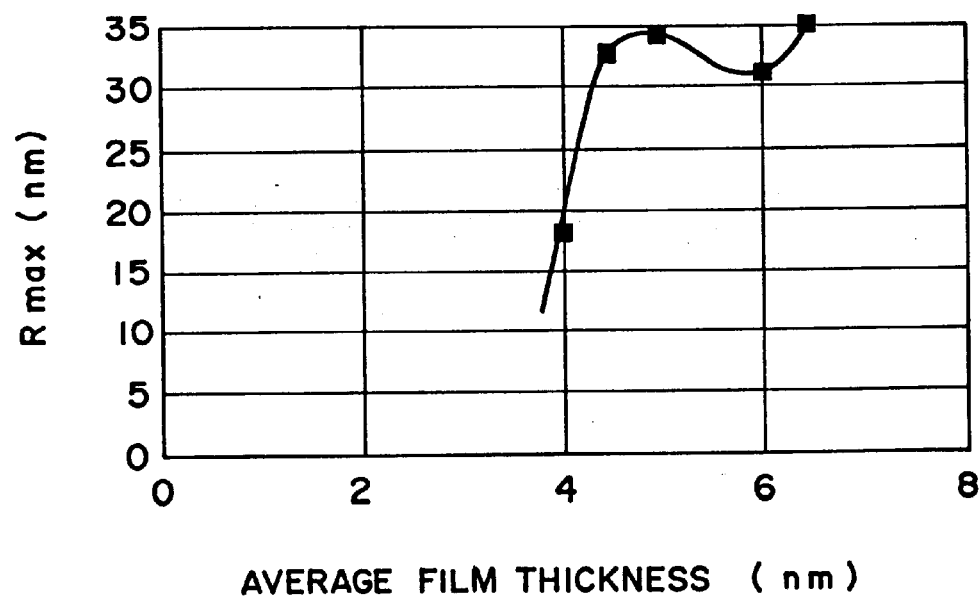
FIG. 3 is a graph showing a relation between an average film thickness of an irregularity forming layer and Rmax according to comparative examples 9 to 13.

The average film thickness (nm), the surface roughness (Rmax) and (Rq/Ra) of the irregularity forming layer 4 of the obtained magnetic recording medium are represented in Tables 3 and 4. Further, the relation between the average film thickness (nm) of the irregularity forming layer 4 and the surface roughness (Rmax) is indicated in FIGS. 2 and 3 as graphs.

TABLE 3

| Irregularity Forming Layer | | Average Film Thickness (nm) | Surface Roughness (Rmax) | Rq/Ra | Head Crash |
|---|---|---|---|---|---|
| Example | 12 | 6.5 | 35.0 | 1.5 | ○ |
| | 13 | 6 | 32.0 | 1.4 | ○ |
| | 5 | 5 | 28.0 | 1.3 | ○ |
| | 14 | 4.5 | 25.0 | 1.2 | ○ |
| | 15 | 4 | 22.0 | 1.2 | ○ |

(Substrate: Glass Substrate in Example 5)

TABLE 4

| Irregularity Forming Layer | | Average Film Thickness (nm) | Surface Roughness (Rmax) | Rq/Ra | Head Crash |
|---|---|---|---|---|---|
| Comparative Example | 9 | 6.5 | 35.0 | 2.1 | X |
| | 10 | 6 | 31.0 | 1.6 | X |
| | 11 | 5 | 34.0 | 1.8 | X |
| | 12 | 4.5 | 32.5 | 1.7 | X |
| | 13 | 4 | 18.0 | 1.6 | X |

(Substrate: Glass Substrate in Comparative Example 9)

Seen from these results, the film thickness of the irregularity forming layer and the surface roughness are in a linear relation in the glass substrate of the above-mentioned examples. Consequently, the surface roughness can be easily controlled to obtain the high CSS durability so that the magnetic recording medium having the high reliability is obtained. On the other hand, the relation between the film thickness of the irregularity layer and the surface roughness is variable in the glass substrate (the comparative example) having large surface roughness. Consequently, it is excessively difficult to control the surface roughness of the irregularity forming layer. As a result, the reliability becomes low.

Moreover, each example and each comparative example were examined with respect to the ration (Rq/Ra) of the surface roughness of the irregularity forming layer. The abnormal projection of the irregularity forming layer due to the variation of the surface roughness of the substrate and the variation of the surface roughness occur in the comparative examples. In the examples, the irregularity forming layer satisfies Rq/Ra≦1.5, and no head crash occurs because the surface roughness of the substrate is excellent. On the other hand, the magnetic recording medium satisfies Rq/Ra>1.5 due to the variation of the surface roughness of the glass substrate and the abnormal projection. In this case, it is confirmed that the head crash occurs.

Although not indicated in the figure, the relation between the film thickness of the irregularity forming layer and the surface roughness and the relation between the variation and the head crash were investigated for the glass substrates of the above-mentioned examples 6 to 11 and the comparative examples 6 to 8 in a similar manner as the above. The examples 6 to 11 had the same trend as Table 3 and the graph of FIG. 2 while the comparative examples had the same trend as Table 4 and the graph of FIG. 3. Therefore, the surface roughness of the irregularity forming layer can be precisely controlled and the variation of the surface roughness can be suppressed by using the glass substrate according to this invention. Consequently, the magnetic recording medium having the high reliability can be obtained.

Examples 16 to 20, Comparative Examples 14 to 16

The magnetic recording media were manufactured by adjusting the film thickness of the irregularity forming layer and the sputtering condition in the same manner as the example 5 except that the surface roughness of the irregularity forming layer was changed into 9 nm (comparative example 14), 10 nm (example 16), 20 nm (example 17), 30 nm (example 18), 40 nm (example 19), 50 nm (example 20) and 55 nm (example 15). Further, the magnetic recording medium was manufactured in the same manner as the example 5 except that the irregularity forming layer having the surface roughness (Rmax) of 10 nm was formed on the glass substrate of the above-mentioned comparative example. In this event, the surface roughness of the irregularity forming layer, the CCS durability and the characteristic of the head crash are represented in Table 5.

TABLE 5

| | | Rmax (nm) | CSS Durability (100,000 times) | Head Crash |
|---|---|---|---|---|
| Comparative Example | 14 | 9 | X | ○ |
| Example | 16 | 10 | ○ | ○ |
| | 17 | 20 | ○ | ○ |
| | 18 | 30 | ○ | ○ |
| | 19 | 40 | ○ | ○ |
| | 20 | 50 | ○ | ○ |
| Comparative Example | 15 | 55 | ○ | ○ |
| | 16 | 10 | ○ | X |

As seem from the above-mentioned result, when the surface roughness of the irregularity forming layer is less than 10 nm, the magnetic head adsorbed with the magnetic recording medium. Consequently, the high CSS durability could not be obtained. The glass substrate haviang the high surface roughness was used like the comparative example 16. As a result, the projection of the surface roughness of the irregularity forming layer was increased with the abnormal projection on the surface of the glass substrate. Consequently, as shown in Table 5, the head crash due to the abnormal projection occurred. Thereby, the magnetic disk as well as the magnetic head were subjected to a fatal damage. Further, the magnetic head could not run at the low flying height in the comparative example 15 because the surface roughness Rmax was large. Consequently, the comparative example 15 is undesirable for recording and reproducing at the high density.

Example 21, Comparative Example 17

The magnetic disk in which the irregularities were formed on the surface by forming the irregularity forming layer is exemplified in the above-mentioned examples. Alternatively, the magnetic disk may be usable as a contact type magnetic disk drive by reflecting excessively high smoothness and flatness of the glass substrate used in the above-mentioned examples into the surface of the magnetic disk without the irregularity forming layer. Hereinafter, the glass substrate of the example 5 was used as the glass substrate of the contact type magnetic disk in the example 21 while the glass substrate of the comparative example 5 was used as the glass substrate in the comparative example 17.

Figure 4:
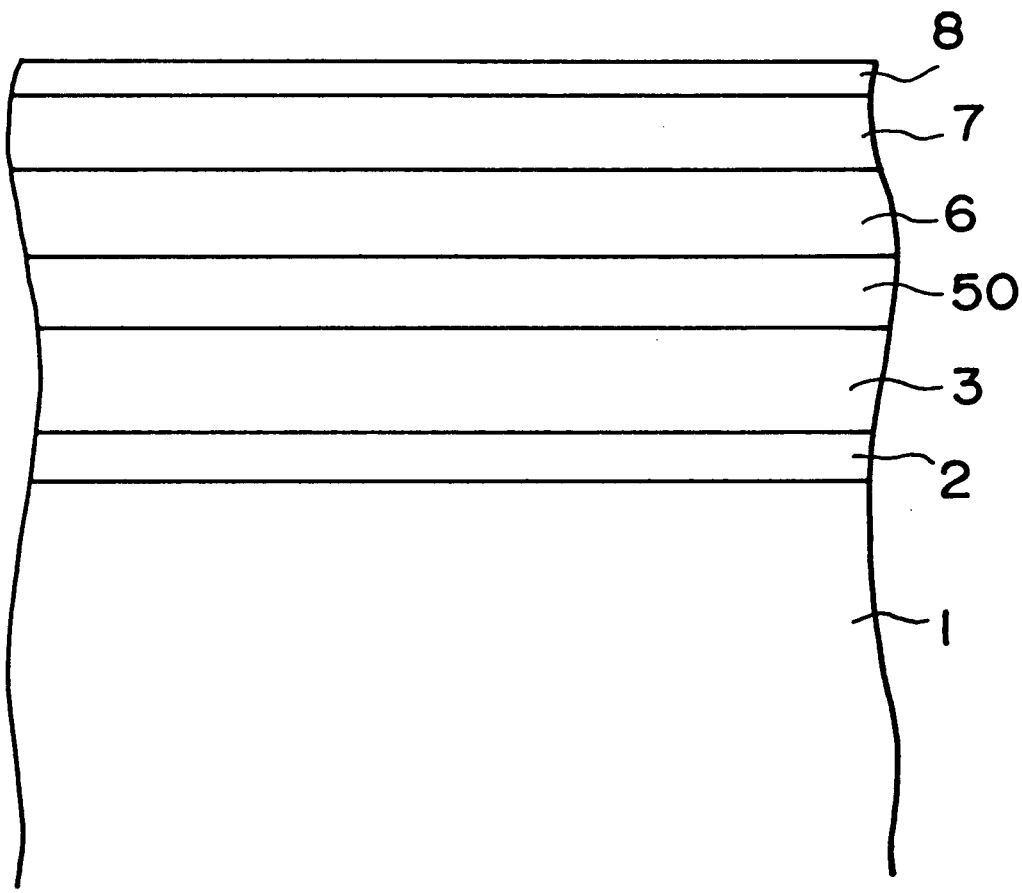
FIG. 4 shows a film structure of a magnetic recording medium according to an example 21 and a comparative example 17.

In the magnetic recording medium illustrated in FIG. 4, a first underlying layer 2 (Al: the average film thickness 5 nm), a second underlying layer 3 (Cr: the average film thickness 50 nm), a third underlying layer 50 (CrMo: Cr: 94 at %, Mo: 6 at %, the average film thickness 30 nm), a magnetic layer 6 (CoCrPrTa: Co: 78 at %, Cr: 13 at %, Pt: 6 at %, Ta: 3 at %, the average film thickness 24 nm), a protection layer 7 (carbon: the average film thickness 15 nm) and a lubricant layer 8 (perfluoropolyether liquid lubricant layer: the average film thickness 1 nm) were successively formed on a glass substrate 1.

The results similar to the above-mentioned examples and comparative examples were obtained in these example and comparative example. Namely, the crystal grains of the underlying layer and the magnetic layer formed on the glass substrate became excellent in the case of the magnetic disk of the example 21 in which the glass substrate of the example 5 was used, Consequently, the contact type magnetic disk having excellent magnetic characteristic and record/reproduce characteristic (coercive force: 2400 Oe, S/N ratio: 24.5 dB) could be obtained. On the other hand, the grain sizes which constitute the underlying layer and the magnetic layer formed on the glass substrate were varied in the case of the magnetic disk of the comparative example 16 in which the glass substrate of the comparative example 9 having a bad surface condition was used. Consequently, the S/N ratio was deteriorated into 21.0 dB. Thus, the record/reproduce characteristic became bad.

Figure 5:
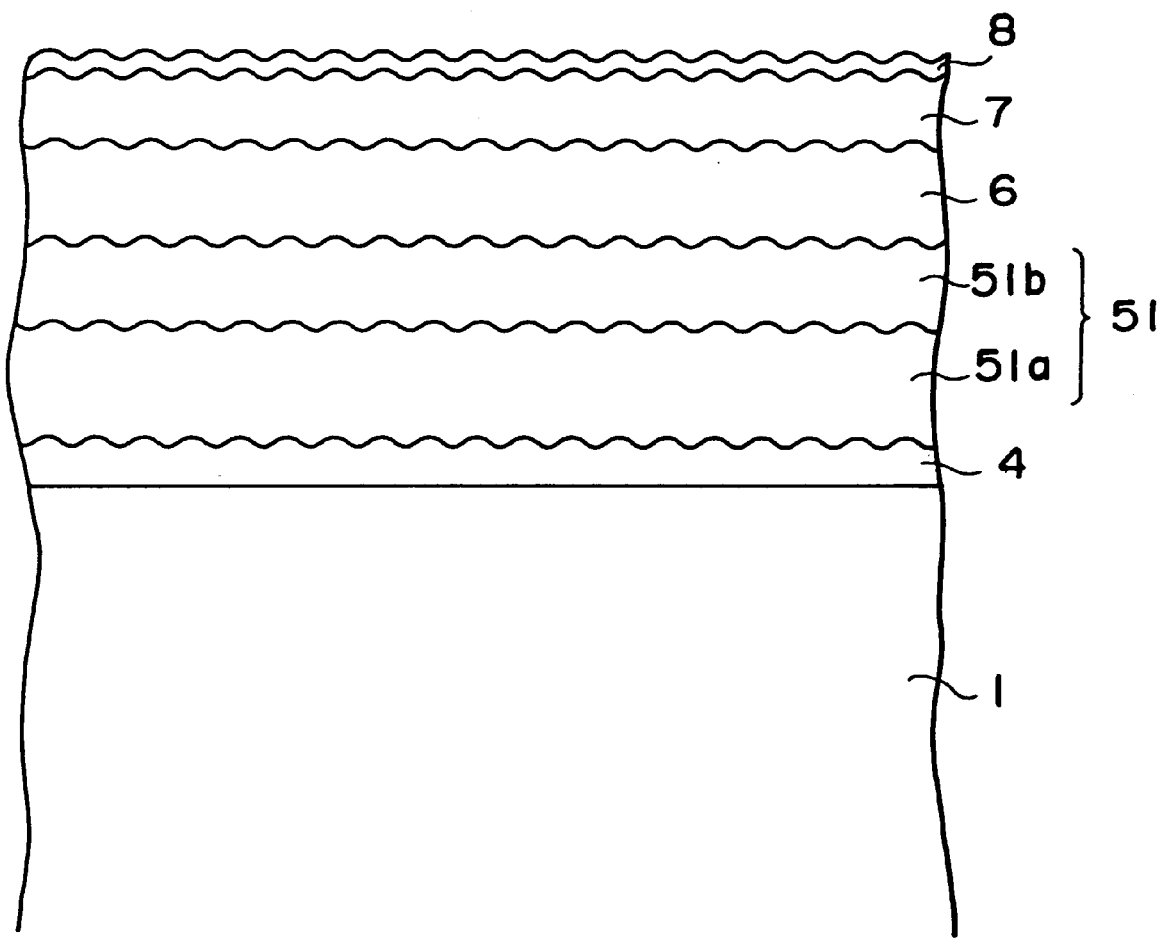
FIG. 5 shows a film structure of a magnetic recording medium according to a modification example.

Although the magnetic disk was manufactured by using the in-line type successive sputtering apparatus in the above-mentioned examples, the same result could be obtained even when the known still standing opposed type sputtering apparatus was used. Although the irregularity forming layer was formed on the underlying layer of Al/Cr in the above-mentioned examples, the irregularity forming layer might be directly formed on the surface of the glass substrate without the underlying layer. In the magnetic recording medium illustrated in FIG. 5, the irregularity forming layer 4, the underlaying layer 51 consisting of the Cr layer 51*a* and the CrMo layer 51*b*, the magnetic layer 6, the protection layer 7 and the lubricant layer 8 are successively formed on the glass substrate 1.

Metal materials having a low melting point constituting the irregularity forming layer are preferably selected from metals such as Al, Ti, Cr, Ag, Nb, Ta, Bi, Si, Zr, Cu, Ce, Au, Sn, Pd, Sb, Ge, Mg, In, W, Pb and alloys thereof or oxide, nitride and carbide of these metals and alloys. A material containing Al as a main component, such as a single substance of Al, Al alloy, oxide Al and nitrogen Al, is particularly preferable. Among others, Al and nitrogen Al are most preferable. The configuration of the irregularity forming layer may be a successive texture film or discretely island-like projections.

Further, the irregularity forming layer may be formed only on a landing zone. Alternatively, the irregularity forming layer may be a zone texture which is formed by smoothing a read/write zone and roughening the surface roughness of the landing zone. Further, the irregularity forming layer may be omitted in accordance with the kind of the used drive.

A surface reinforced glass substrate and a crystallized glass substrate are exemplified as the glass substrate used in this invention. Specifically, aluminosilicate glass, aluminoborosilicate glass, borosilicate glass, silicate glass, soda-lime glass and oxyniteride glass are exemplified. Further, a non-metal substrate, such as a ceramic substrate, a glass ceramic substrate, a silicon substrate and a carbon substrate is exemplified as a substrate having the same characteristic as the glass. Moreover, the glass substrate of this invention is useful as the substrate for an optical disk other than the magnetic disk.

A material containing Ge, Ga, Zr and Ti as a main component other than Al may be used as the first underlying layer 2. An alloy containing Cr as a main component other than a single substrate of Cr may be used as the second underlying layer 3.

Further, the third underlying layer 5 may be formed by one layer or more containing at least one element or more selected from a group consisting of Cr, Mo, Zr, B, Si, Zn, Ti, W, V, Ta and Al.

In this case, it is preferable that Al is used as the first underlying layer 2 and Cr is used as the second underlying layer 3 to control the crystal growth of each layer. Consequently, the irregularities of the irregularity forming layer 4 of the metal thin film having the low melting point formed thereon can be precisely controlled without the variation. Further, the low flying height can be realized by the synergistic effect with the characteristic of theaglass substrate to improve reproducing output.

Co based alloys, such as CoPt, CoCr, CoNi, CoPtCr, CoCrTa, CoNiCr, CoNiPt, CoNiCrTa, CoNiCrPt, CoCrPtTaNb, CoCrPtTaZr, CoCrPtTaSiO other than CoCrPtTa, a ferrite-based material or an iron-rare earth-based material may be used as the magnetic layer 6. Alternatively, a multi-layer film which is formed by dividing the magnetic layer with a non-magnetic film (for example, Cr, CrMo, CrV) to reduce a noise may be used as the magnetic layer 6. For example, CoCrPtTa/CrMo/CoCrPtTa, CoPtCr/CrMo/CoPtCr (the left side of '/' is closer to the substrate) may be used.

Moreover, the protection layer 7 is formed by a single layer of the carbon protection layer in the above-mentioned examples. However, the protection layer 7 is not restricted this case. For example, the non-magnetic material such as Cr, Mo, Ti, TiW, CrMo, Ta, W, Si, and Ge or alloy of them, oxide, nitride and carbide may be interposed between the carbon protection layer and the magnetic layer. A $SiO_2$ film may be formed instead of the carbon protection layer by dispersing colloidal silica fine grains in tetraalkoxysilane diluted with an alcohol-based solvent and thereafter by coating and baking the dispersed grains. In this event, the $SiO_2$ film functions both the protection layer and the irregularity forming layer.

In addition, fluorocarbon based liquid lubricant material or a lubricant material consisting of alkali metal salt of sulfonic acid may be used as the material of the lubricant layer 8 other than perfluoropolyether. It is desirable that the film thickness of the lubricant layer 8 falls within the range between 0.5 and 2 nm. When the film thickness is less than 0.5 nm, the resistance to abrasion is reduced. When the film thickness exceeds 2 nm, the adsorption occurs without improvement of the resistance to abrasion. In this event, when the protection layer itself has a lubricant effect, the lubricant layer may be omitted.

What is claimed is:

1. A magnetic recording medium having at least a thin-film magnetic layer on a glass substrate, wherein:

said glass substrate has surface roughness Ra, Rmax, and Rq, where Ra is representative of a center-line mean roughness; Rmax is defined as a maximum height representative of a difference between a highest point and a lowest point, and Rq is representative of a root mean square roughness;

the surface roughness measured by an interatomic force microscope is specified by $Rmax \leq 15$ nm, $Ra \leq 1$ nm, and $Rq \leq 1.5$ nm; and the ratio between the surface roughness Rmax and the surface roughness Ra is specified by $10 \leq Rmax/Ra \leq 30$.

2. A magnetic recording medium as claimed in claim 1, wherein:

the surface roughness is specified by $Rmax \leq 10$ nm, $Ra \leq 0.5$ nm, $Rq \leq 0.7$ nm.

3. A magnetic recording medium as claimed in claim 1, wherein:

the surface roughness is specified by $Rmax \leq 5$ nm, $Ra \leq 0.3$ nm, and $Rq \leq 0.4$ nm.

4. A magnetic recording medium as claimed in claim 1, wherein:

said thin-film is composed of substantially uniform crystal grains by controlling the surface roughness of said glass substrate; and said magnetic layer has a crystal grain size falling within the range between 5 and 30 nm.

5. A magnetic recording medium as claimed in claim 4, wherein:

an underlying layer is formed between said glass substrate and said magnetic layer;

said underlying layer has crystal grains; and said magnetic layer is formed on the condition that a state of the crystal grains is reflected directly.

6. A magnetic recording medium as claimed in claim 5, wherein:

said underlying layer and said magnetic layer in said thin film are deposited by sputtering.

7. A magnetic recording medium as claimed in claim 6, wherein:

the uniformity of said crystal grains of said thin film is determined with respect to distribution of crystal grain sizes in a square of 1 μm, and a half bandwidth of a point in which the crystal grain sizes are distributed is 20 nm or less.

* * * * *